(12) United States Patent
Moiraghi et al.

(10) Patent No.: US 10,358,004 B2
(45) Date of Patent: Jul. 23, 2019

(54) DEVICE AND ASSEMBLY FOR DETECTING TIRE PARAMETERS OF TRANSITING VEHICLES

(71) Applicant: STE S.R.L., Milan (IT)

(72) Inventors: Paolo Maria Moiraghi, Marcignago (IT); Mauro Cortese, Limbiate (IT)

(73) Assignee: STE S.R.L., Milan (IT)

( * ) Notice: Subject to any disclaimer, the term of this patent is extended or adjusted under 35 U.S.C. 154(b) by 0 days.

(21) Appl. No.: 15/023,945

(22) PCT Filed: Sep. 25, 2013

(86) PCT No.: PCT/IT2013/000256
§ 371 (c)(1),
(2) Date: Mar. 22, 2016

(87) PCT Pub. No.: WO2015/044966
PCT Pub. Date: Apr. 2, 2015

(65) Prior Publication Data
US 2016/0214446 A1     Jul. 28, 2016

(51) Int. Cl.
*B60C 23/04*     (2006.01)
*G07C 5/00*     (2006.01)

(52) U.S. Cl.
CPC ...... *B60C 23/0479* (2013.01); *B60C 23/0433* (2013.01); *G07C 5/008* (2013.01)

(58) Field of Classification Search
CPC .. B60C 23/0479; B60C 23/0433; G07C 5/008
See application file for complete search history.

(56) References Cited

U.S. PATENT DOCUMENTS

| 2003/0094942 | A1  | 5/2003 | Friend et al. |
| 2008/0164988 | A1* | 7/2008 | DeKeuster ......... B60C 23/0408 340/442 |
| 2009/0144017 | A1  | 6/2009 | Penot et al. |
| 2010/0141416 | A1* | 6/2010 | Kukshya ............ B60C 23/0408 340/447 |
| 2011/0074346 | A1  | 3/2011 | Hall et al. |
| 2012/0176233 | A1* | 7/2012 | Petrucelli ........... B60C 23/0401 340/447 |

(Continued)

FOREIGN PATENT DOCUMENTS

| CN | 1605030 | 4/2005 |
| CN | 1938170 | 3/2007 |
| CN | 1949292 A | 4/2007 |

(Continued)

OTHER PUBLICATIONS

Translation of JP 2008-100613.*
(Continued)

*Primary Examiner* — Patrick N Edouard
*Assistant Examiner* — Eboni N Hughes
(74) *Attorney, Agent, or Firm* — Ferguson Case Orr Paterson

(57) ABSTRACT

A device for detecting tire parameters of transiting vehicles, comprising an electronic unit for processing radio signals that carry measurements of at least one parameter of at least one tire of a vehicle, such as the pressure, and further comprising a detector of the transit of vehicles for the activation of the processing of the radio signals.

12 Claims, 2 Drawing Sheets

(56) References Cited

U.S. PATENT DOCUMENTS

2012/0318624 A1* 12/2012 Dickson ................... B60L 9/18
191/10

FOREIGN PATENT DOCUMENTS

| | | |
|---|---|---|
| CN | 101458830 | 6/2009 |
| CN | 202637738 | 12/2012 |
| CN | 103210562 | 7/2013 |
| EP | 2065229 A1 | 6/2009 |
| JP | H09-211144 A | 8/1997 |
| JP | 2005-031953 A | 2/2005 |
| JP | 2008 100613 | 5/2008 |
| JP | 2008-104004 A | 5/2008 |
| JP | 2009-104654 A | 5/2009 |
| JP | 3155462 U | 10/2009 |
| JP | 2012-019578 | 1/2012 |
| JP | 2007-331522 A | 12/2017 |
| WO | WO 2005/072993 A1 | 8/2005 |

OTHER PUBLICATIONS

International Search Report (PCT/ISA/210) for PCT/IT2013/000256 dated Mar. 6, 2014.
Japanese Office Action for Application No. 2016-518077, dated Nov. 2, 2017.

* cited by examiner

DEVICE AND ASSEMBLY FOR DETECTING TIRE PARAMETERS OF TRANSITING VEHICLES

The present invention relates to a device and an assembly for detecting automatically parameters of tires mounted on transiting vehicles, particularly on heavy vehicles.

BACKGROUND OF THE INVENTION

In the field of road transport, accurate vehicle maintenance is the best strategy to minimize the possibility of encountering sudden and unexpected failures, which can cause great losses of time and often considerable costs, which arise both from the possible costs for repairing the failures that have occurred and from the temporary inactivity of the vehicles themselves, especially if they are used in work (for example for the transport of goods). Equally, the possible risks of road accidents caused by failures that vehicles can experience during travel also must be considered.

To prevent the technical inconveniences that all types of road vehicle can encounter, and therefore to avoid the economic inconveniences and the road safety problems related to them, it is indispensable to perform scrupulous periodic maintenance of the mechanical components of the vehicle in use, which necessarily operate must operate in conditions of perfect efficiency, particularly elements such as tires, the maintenance of which is often neglected. Such maintenance provides mainly for two steps: the measurement and optional adjustment of the pressure of the tire, the optimum value of which is defined on the basis of the mass of the vehicle and on the tire being used, and the assessment of the thickness and general conditions of the tread.

Unfortunately, most vehicles are not subjected to this type of periodic tire check, often due to the negligence of the person in charge of the vehicle or more simply due to that person's lack of time and/or money. If someone who habitually uses the vehicle does not detect particular grip problems while driving, he will not see the need for any maintenance intervention. On the contrary, if the person who uses the vehicle habitually detects difficulties in driving due to the tires, quite probably it will be too late to perform a normal maintenance intervention, since an excessive or in any case irregular wear of the tread might occur which is caused by insufficient tire pressure, a condition for which replacement thereof would be necessary.

Recently, with the development of telemetry, systems have been developed for the automatic measurement and/or analysis of vehicle parameters and in particular also of parameters related to tires, such as pressure. However, these systems are not used regularly by vehicle operators, since they require high power consumption, due the continuous power supply of the electronic components involved, which must be ensured in order to be able to monitor such parameters. The power consumption, however, does not lead to a large number of measurement/analysis operations performed by the systems, since said systems, in normal conditions, spend most of the time in an active condition but in standby, until a vehicle to be subjected to the preset checks approaches.

Moreover, known systems are mostly isolated and process data exclusively locally, depriving the user of the possibility to gather, in any manner, a broader set of information, for example related to all the vehicles (such as light and heavy road tractors, trucks, trailers, semitrailers, vans) that belong to a company that is active in the field of goods transportation.

SUMMARY OF THE INVENTION

The aim of the present invention is to provide a device and an assembly that are capable of improving the background art in one or more of the aspects indicated above.

Within this aim, an object of the invention is to provide a device and an assembly that allow to detect automatically the parameters related to the tires of a transiting vehicle while maintaining low power consumption.

Moreover, an object of the present invention is to obtain a device and an assembly that allow maintenance intervention on the tires of the vehicle only if actually necessary.

Another object of the invention is to provide a device and an assembly that are highly reliable, relatively easy to provide and at competitive costs.

This aim, as well as these and other objects that will become better apparent hereinafter, are achieved by a device for detecting tire parameters of transiting vehicles, comprising an electronic unit for processing radio signals that carry measurements of at least one parameter of at least one tire of a vehicle, such as the pressure, characterized in that it comprises furthermore a detector of the transit of vehicles for the activation of said electronic unit for processing radio signals.

This aim and these objects are also achieved by an assembly for detecting tire parameters of transiting vehicles, characterized in that it comprises, arranged in different positions along a drivable path, a master unit, which comprises said detection device, and at least one slave unit, which comprises a respective unit for receiving said radio signals, said master unit and said at least one slave unit being mutually connected by means of a local communications network.

BRIEF DESCRIPTION OF DRAWINGS

Further characteristics and advantages of the invention will become better apparent from the description of a preferred not exclusive embodiment of the device and of the assembly according to the invention, illustrated by way of nonlimiting example in the accompanying drawings, wherein.

DESCRIPTION OF PREFERRED EMBODIMENTS

Figure 1:
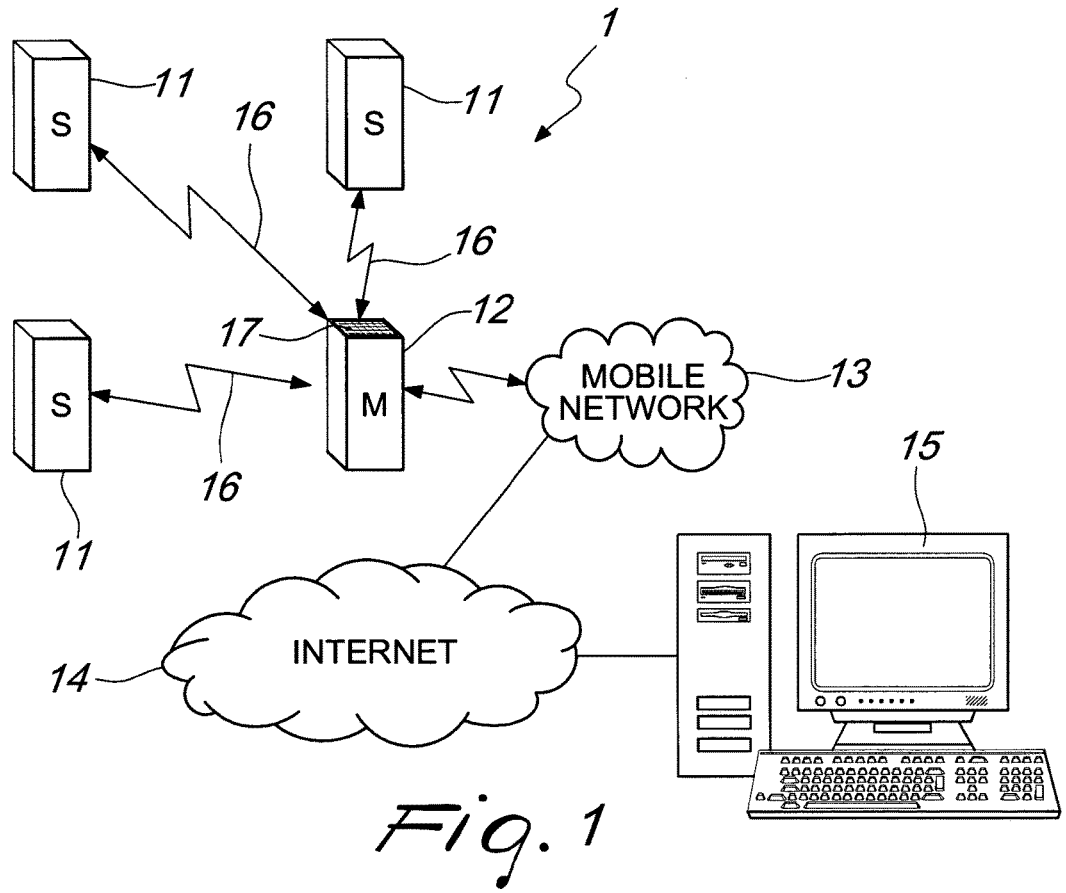
FIG. 1 is a block diagram related to an architecture of the assembly for detecting the parameters related to the tires of transiting vehicles according to the invention.
Figure 2:
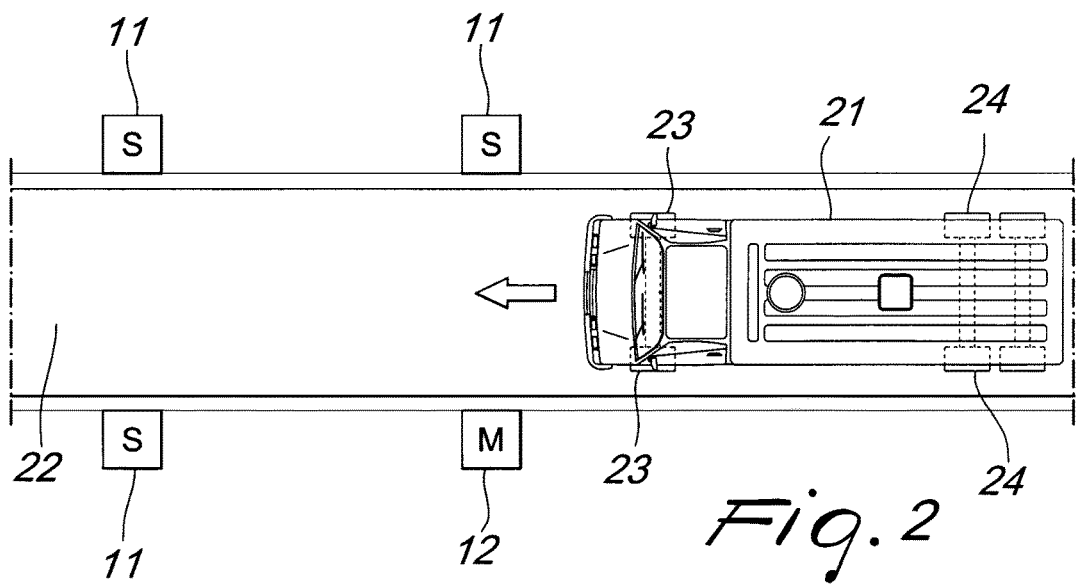
FIG. 2 is a schematic top view of a possible application of the invention.

With reference to the figures, an assembly for detecting tire parameters of transiting vehicles, generally designated by the reference numeral 1, comprises a master unit 12 and optionally one or more corresponding slave units 11 that communicate with the master unit 12 via a local communications network 16, which is preferably a network of the wireless type that operates at a frequency in the ISAM (Industrial, Scientific and Medical) band or for SRD (Short Range Device) systems, for example at 868 MHz.

The master unit 12 and the slave units 11 are arranged on transversely opposite sides of a drivable path 22 and the total number of units of the assembly 1 can vary from 1 to 16.

The units 11 and 12 can be supplied with power by means of at least one solar panel 17, 47 respectively, or by means of at least one battery.

The master unit 12 comprises, inside a closed enclosure, such as for example a turret, a device for detecting tire parameters of transiting vehicles, which comprises an electronic unit 31 for the treatment of radio signals that carry measurements of at least one parameter of at least one tire 23, 24 of a transiting vehicle 21. In the preferred embodiments of the invention, the parameter that is detected is the pressure of each one of the tires 23, 24 of the transiting vehicle.

This measurement can be made possible in a known manner with vehicles 21 that have, in each tire 23, 24, a respective pressure detector that is associated with or connected to a radio transmitter for the measured pressure data, in particular a TPMS (Tire Pressure Monitoring System) transmitter of any type. The TPMS transmitter, not shown in the drawings, can be for example integrated together with the pressure detector in a single patch that is fixed to the inner surface of the tire or on a rigid connector that can be fixed to the tire inflation valve, as described in European patent application EP-A-1787831, which is included herein by reference.

The TPMS transmitter has an identification code and is associated uniquely with a specific tire 23, 24 of a specific vehicle 21, in a manner that is known, to a remote processing unit 15 of a vehicle operator, for example a haulage company.

Each slave unit 11 comprises a respective unit 41 for receiving said radio signals, which carry measurements of at least one parameter of at least one tire.

A particularity of the master unit 12 is that it comprises a detector for the passage of vehicles that is capable of generating an internal activation signal that is used to activate the treatment of the radio signals that comprise the measurements of the pressure of the tires, in particular to access the electronic unit 31 for the processing of said radio signals, moving it from a sleep/standby or low power consumption state to an active state together with the peripherals or modules connected thereto.

These radio signals that carry the measurements of the pressure and/or of other parameters of the tires are per se of a known type, for example are pulse modulation signals. Transport of the information related to the measurement is preferably obtained in a known manner by means of a PPM (Pulse Position Modulation) modulation of words that correspond to measurement values, for example of sequences of bits that correspond to an encoding of the measured values, said modulation being followed by a modulation at a given carrier RF frequency (preferably at an IASM frequency such as 434 MHz), as described for example in European patent application EP-A-1787831, which is included herein by reference.

The vehicle transit detector is advantageously a magnetometer 35, which is per se capable of detecting the presence of large approaching metallic masses and therefore of all kinds of road vehicle, generating an activation signal that is internal to the master unit 12 in case of a positive result.

Thanks to the use of the magnetometer 35, the need to install on board the vehicle 21 devices that have the sole purpose of activating the processing of the radio signals at the master unit 12 is avoided entirely.

More generally, it is possible to use as a vehicle transit detector a metal detector or a detector of the variation of the terrestrial magnetic field, both of which are per se known.

Figure 3:
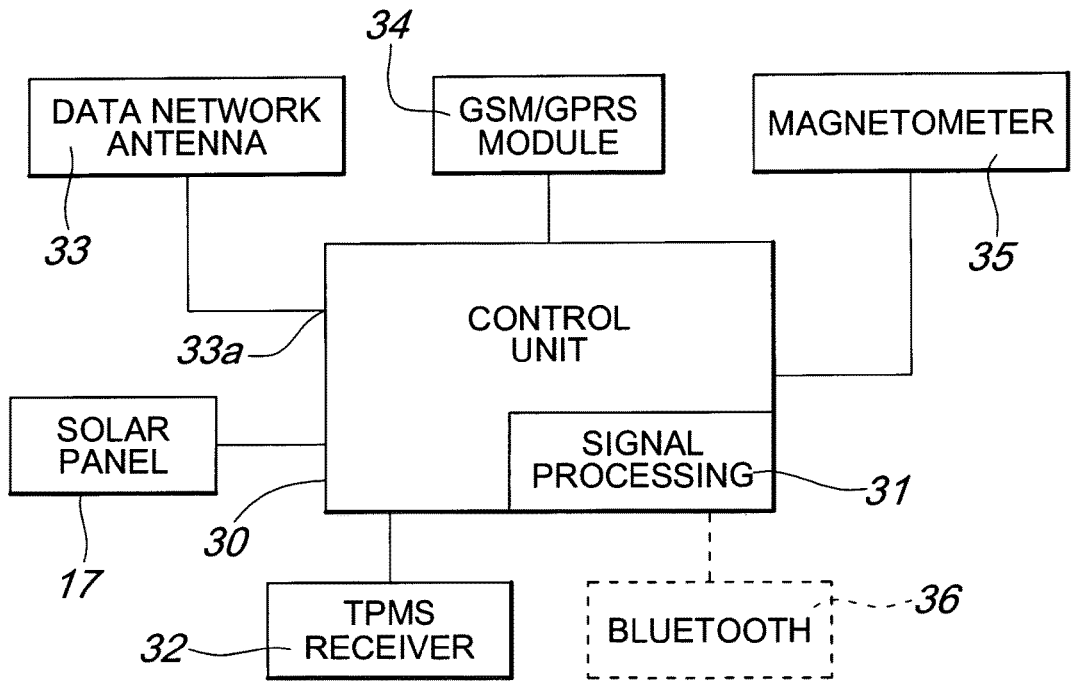
FIG. 3 is a block diagram of a preferred embodiment of the electronic components of a detection device according to the invention.
Figure 4:
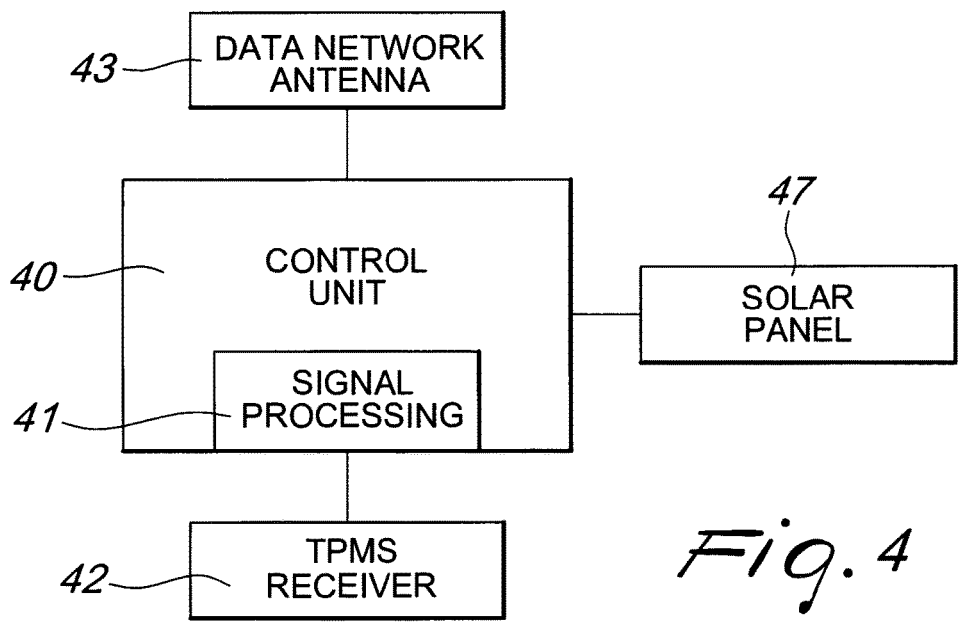
FIG. 4 is a block diagram of a preferred embodiment of the electronic components of a slave unit according to the invention.

The master unit 12 comprises several electronic components, for example the ones shown in FIG. 3, which are normally in a sleep/standby or low power consumption state and can be activated by means of an internal activation signal that is generated by means of the magnetometer 35 or, more generally, by means of the vehicle transit detector, which instead is kept always active.

The electronic components of the master unit comprise the electronic unit 31 for processing the radio signals that carry the measurements of the pressure or of other parameters of the tires 23, 24. Said electronic unit can be obtained in a control unit 30, by means of at least one microprocessor that is programmed appropriately to process the information extracted from the radio signals received at the master unit 12, in order to prepare messages or signals to be transmitted over the local communications network 16 or remotely and to manage the modules connected to the control unit 30.

These modules can be a radio signal receiver 32, a data network antenna 33, a communications module 34 for connection to a mobile telephone network, the magnetometer 35 and an optional Bluetooth module 36.

The magnetometer 35, which can be of the scalar or vector type, allows the control unit 30 to be activated and to activate or keep in the active state the modules connected thereto and listed above.

The radio signal receiver 32 is preferably a TPMS (Tire Pressure Monitoring System) receiver, assigned in particular to receiving the pulsed radio signals, for example pulses with PPM modulation as described above, and allows the processing unit 31 to receive in input the measurements of the pressure of the tires of a transiting vehicle provided with a corresponding TPMS transmitter on each tire. The radio signal receiver 32 is per se of a known type, for example it can be the one described in international patent application PCT WO2012/150565 A2, which is included herein by reference.

The data network antenna 33 is provided if the local communications network 16 between the master unit 12 and the slave units 11 is of the wireless type. Such antenna 33 can be, for example, an antenna that is tuned to a frequency in the ISM band or for SRD systems (for example 868 MHz) and is connected to a communication port 33a of the control unit 30 by means of which the control unit 30 transmits and receives signals to be exchanged with the slave units 11, for example the external activation signal for the slave units 11 or the signals that carry the messages with the data of the additional pressure measurements or of other parameters of the tires 23, 24 extracted from the slave units 11, as described hereinafter.

The optional Bluetooth module 36 can be used to allow communication between the control unit 30 of the master unit 12 and an external computer that is adapted to configure the master unit 12 and/or the local communications network 16 and check its correct operation.

The communication module 34 for connection to a mobile telephone network 13 is per se of a known type and can be a GSM/GPRS or UMTS transceiver, capable of accessing the mobile network 13 and of communicating, optionally by means of adapted gateways and the Internet 14, with the remote processing unit 15, so as to transmit to said remote processing unit 15 the measurements received via the PPM radio signals and/or via the communication port 33a or alarm signals.

As mentioned, the control unit 30 is programmed to prepare messages or signals to be transmitted on the local communications network 16 and to send them to the corresponding communication port 33a. Among these messages or signals there is, in particular, an external activation signal, which is generated by the control unit 30 when the magnetometer 35 detects the transit of a vehicle 21 and activates accordingly the electronic components of the master unit 12 with the internal activation signal.

The external activation signal is generated and transmitted from the master unit 12 to the slave units 11 via the local communication network 16, by means of the antenna 33.

Each one of the slave units 11 is configured to keep the respective electronic components in a sleep/standby or low power consumption state and to activate them upon receiving said external activation signal, leaving the slave unit 11 in a listening configuration on a respective communication port toward the local communications network 16. These electronic components of the slave unit 11 include a unit 41 for receiving the radio signals that carry measurements of at least one parameter of at least one tire 23, 24 of a transiting vehicle 21. This receiving unit 41 can be obtained in a control unit 40, by means of at least one microprocessor that is programmed appropriately to process the information extracted from the radio signals received at the slave unit 11, to prepare messages to be transmitted to the master unit 12 by means of the local communication network 16 and to manage the modules connected to the control unit 40, which comprise a radio signal receiver 42 and a data network antenna 43, for example an antenna that is tuned on a frequency in the ISM band or for SRD systems (for example 868 MHz).

The receiver 42 is identical to the receiver 32 used in the master unit 12; in particular, it is a TPMS receiver adapted to receive the pulsed radio signals, for example with PPM modulation as described above, which are transmitted by the TPMS transmitters that are present on the tires of the vehicles, and allows the control unit 40 to receive in input the measurements of the pressure of the tires 23, 24 of a transiting vehicle provided with a TPMS transmitter in each tire.

The radio signals transmitted by the TPMS transmitters of all the tires of a vehicle might be received and processed only by the master unit 12. However, in order to increase the resolution of the received measurements, it is preferable to use also one or more of said slave units 11, each capable of receiving, processing and transmitting to the master unit 12, by means of the communication network 16, the received measurements.

Operation of the illustrated embodiment is as follows.

The control units 30 and 40 of the master unit 12 and of the optional slave units 11 are normally in a sleep or low power consumption or standby state and keep in the off state all the modules or peripherals that are connected thereto except for the magnetometer 35 and the antenna 43, which instead remain active. When a vehicle 21 approaches the drivable path 22 along which the units 11 and 12 are arranged, preferably at a speed that does not exceed 10 or 15 km/h, the magnetometer 35 of the master unit 12 detects its presence and generates the internal activation signal, which it sends to the control unit 30, shifting it from the sleep/standby or low power consumption state to the active state.

The control unit 30 of the master unit 12 in turn activates the TPMS receiver 32, the communication port 33a and the antenna 33 and sends, via the local communications network 16, the external activation signal to all the slave units 11 that are connected to said network, in order to activate their electronic components that are in the sleep/standby or low power consumption state.

Said external activation signal can comprise a data collection message for the slave units 11, in response to which the slave units 11 will transmit to the master unit 12 the measurements detected after the activation of the TPMS receiver 42.

Said message can be in any case transmitted subsequently, with a separate signal that is sent by the master unit 12 via the local communication network 16.

The TPMS receivers 32 and 42 demodulate the radio signals transmitted by the TPMS transmitters that are present in the tires 23, 24 of the vehicle 21 and send the demodulated data to the respective control unit 30 and 40. These demodulated data correspond, in the form of sequences of bits, to the received pressure measurements and to the identifier of the TPMS transmitter that sent them, associated uniquely with a respective tire of the vehicle 21.

The presence of slave units 11 and the location of said units and of the master unit 12 on opposite sides of the drivable passage 22 will allow to increase the resolution and precision of the measurements received at the TPMS receivers.

When the measurements have been detected for a first time interval, for example for 30 seconds, the slave units 11 transmit to the master unit 12, via the communications network 16, respective messages that contain the detected measurements, together with the identifiers of the respective TPMS transmitters that generated them. After this transmission, or after the first time interval, all the electronic components of the slave units 11 return to the sleep or low power consumption or standby state, except for the antenna 43.

Optionally, if the magnetometer 35 detects, at the end of the first time interval, the presence of additional transiting vehicles, the master unit 12 sends an additional external activation signal to the slave units 11 via the local communications network 16, in order to keep them active for another period equal to the first time interval.

The measurements acquired at the slave units 11 are extracted from the respective messages at the processing unit 31 of the master unit 12 and are processed together with the measurements received from said master unit 12 via its own TPMS receiver 32. The processing unit 31 generates a sort of database of the acquired measurements, which are divided by originating TPMS transmitter, optionally eliminating redundant measurements.

Periodically, when a second preset time interval ends, the control unit 30 of the master unit 12 can advantageously transmit to the remote processing unit 15, via the communications module 34, one or more messages containing all these measurements. The message can be transmitted with an HTTP protocol or in the form of one or more SMS or email messages.

The remote processing unit 15 performs the appropriate analyses of the measurements received, so that the vehicle operator can monitor the situation of the tires of his several vehicles and decide any maintenance intervention on the vehicle 21 or a telephone notification to the driver or owner thereof.

Preferably, the processing unit 31 of the master unit 12 is configured to compare in real time, with at least one threshold value or with an interval of threshold values stored at the control unit 30, the measurements received from the master unit 12 and sent by the optional slave units 11 for each tire.

If, for a certain TPMS transmitter identifier, the corresponding detected pressure measurement is not within these threshold values, the control unit 30 of the master unit 12 immediately transmits to the remote processing unit 15, by means of the communications module 34, an alarm message that contains the identifier of the TPMS transmitter of the corresponding tire, without waiting for the second time interval to expire.

In this manner, the vehicle operator can schedule or order a maintenance intervention on the vehicle that has the tire with an out-of-threshold pressure value or alert the driver of the vehicle.

In practice it has been found that the device and the assembly according to the invention achieve fully the intended aim, since they allow to measure, by means of radio signals, the parameters, in particular the pressure, related to the tires of a transiting vehicle, keeping the power consumption extremely low, which is particularly useful in case of a power supply with a nonrechargeable battery.

Although the device according to the invention has been conceived in particular to detect the pressure of the tires of a heavy vehicle in transit, it can be used in any case more generally to detect any parameter related to the tires of any type of vehicle, including two-wheeled ones.

The device thus conceived is susceptible of numerous modifications and variations, all of which are within the scope of the inventive concept; all the details may further be replaced with other technically equivalent elements.

In practice, the materials used, as well as the dimensions, may be any according to requirements and to the state of the art.

The invention claimed is:

1. An assembly comprising a master unit and at least one slave unit configured to be arranged in fixed positions on at least one side of a drivable path; said master unit comprising a detection device for detecting tire parameters of transiting vehicles that transit on said drivable path, said detection device comprising electronic components which include an electronic unit for processing radio signals that carry measurements of at least one parameter of at least one tire of a vehicle, said detection device further comprising a magnetometer for an activation of said electronic unit for processing radio signals, wherein said electronic components of said detection device are normally in a sleep or low power consumption state and are configured to be activated by an internal activation signal generated by said magnetometer; said electronic processing unit comprising at least one communication port for connection to the at least one slave unit and adapted to receive from said at least one slave unit additional measurements of said tire parameters of transiting vehicles; said at least one slave unit comprising a respective unit for receiving and processing said radio signals that carry said measurements, said master unit and said at least one slave unit being mutually connected by means of a local communications network, said slave unit being configured to transmit said measurements to said master unit by means of said local communications network so that the same measurements can be received and processed by both the slave unit and the master unit; said magnetometer being configured to detect the presence of approaching metallic masses, so as to generate said internal activation signal for said electronic components in said sleep or low power consumption state when said vehicle approaches said drivable path, wherein said master unit is configured to generate an external activation signal when said electronic components are activated by said internal activation signal and to transmit said external activation signal to said at least one slave unit via said local communications network and said at least one slave unit is configured to keep the respective electronic components of said at least one slave unit in a state of sleep or low power consumption and to activate them with the reception of said external activation signal, so that all said electronic components of said at least one slave unit and of said master unit are activated when said vehicle approaches said drivable path.

2. The assembly according to claim 1, wherein said electronic processing unit comprises, or is connected to, a receiver of said radio signals, which are pulsed radio signals with PPM modulation of words that correspond to measurement values.

3. The assembly according to claim 1, wherein said electronic processing unit comprises, or is connected to, a communication module that is adapted to transmit to a remote processing unit information on said measurements received by means of said radio signals and/or via said communication port according to the preceding claim.

4. The assembly according to claim 3, wherein said communications module is a communications module on a mobile telephone network.

5. The detection assembly according to claim 1, wherein said local communication network is a wireless network, operating at a frequency in the ISM or SRD system band.

6. The detection assembly according to claim 1, wherein said master unit and said at least one slave unit are arranged on mutually opposite sides of said drivable path.

7. The detection assembly according to claim 1, wherein said master unit and said at least one slave unit are configured to make the respective electronic components return to the sleep or low power consumption state.

8. The detection assembly according to claim 7, wherein said master unit is configured so as to verify, by means of said magnetometer, whether at the end of a first preset time interval there are other transiting vehicles and so as to generate, if there are, said additional external activation signal.

9. The detection assembly according to claim 1, wherein said at least one slave unit comprises a transmission unit connected to said local communications network and adapted to transmit to said master unit, via said local communications network, the measurements carried by said radio signals received from the respective reception unit of said at least one slave unit.

10. The detection assembly according to claim 9, wherein said external activation signal comprises a data collection message, said at least one slave unit being configured to transmit to said master unit said measurements following the reception of said data collection message.

11. The detection assembly according to claim 8, wherein said electronic processing unit of the master unit is configured to transmit to a remote processing unit, within a second preset time interval and via said communications module, the measurements of the radio signals received by said master unit and the measurements of said at least one slave unit received by the master unit via said local communications network.

12. The detection assembly according to claim 11, wherein said electronic processing unit of the master unit is configured additionally to perform a comparison, with at least one threshold value, of the measurements of the radio signals received by said master unit and/or of the measurements of said at least one slave unit received by the master unit via said local communications network and to transmit said measurements to the remote processing unit via said communications module as soon as said comparison yields a negative result.

* * * * *